June 4, 1968  TOYOO YAMADA  3,386,280
AIR CLEANER TESTER
Filed July 28, 1966

United States Patent Office 3,386,280
Patented June 4, 1968

3,386,280
AIR CLEANER TESTER
Toyoo Yamada, 7-14 Chuo 5-chome, Ahta-ku,
Tokyo, Japan
Filed July 28, 1966, Ser. No. 568,630
1 Claim. (Cl. 73—38)

ABSTRACT OF THE DISCLOSURE

A testing device for an air cleaner of the type used on automobiles including a casing having an intake opening alignable with an air filter to be tested. An air pressure operated fan disposed in such opening for drawing air from the air filter into a corridor in the casing, the corridor being closed by a baffle plate which is deflected by the air flow and which has an indicator for movement therein to indicate the filter characteristics of the air cleaner.

This invention relates to a testing device for air cleaners, and more particularly for the air cleaners used in the automobiles.

Known testing devices for the air cleaners have many disadvantages, one of which being that electrical motors which are usually used for operating such devices are likely to generate electrical sparks. When such testing device is operated in a gasoline station, a dangerous condition exists because the electrical sparks may cause a combustion of gasoline. As for the constructions of the known devices, the indicator is moved by a float or baffle plate disposed in a separate chamber which has to be constructed for indicating the dynamic pressure by the blowing air. This, however, makes the construction of the device very complex.

One object of the invention is to provide a testing device for air cleaners having simple construction.

Another object of this invention is to provide a testing device for air cleaners operating in a simple manner and eliminating a fire hazard by using air pressure for driving the testing device.

Figure 1:
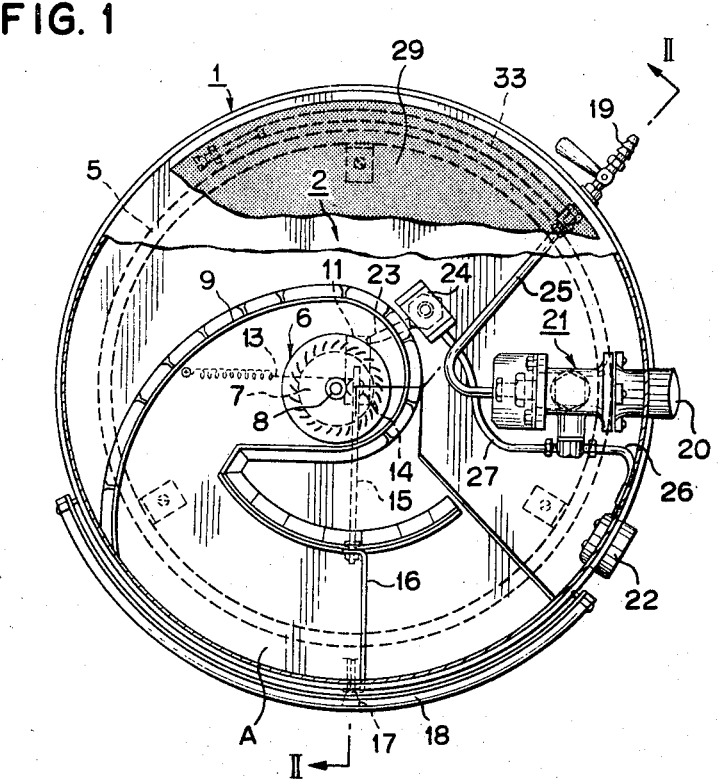
Figure 2:
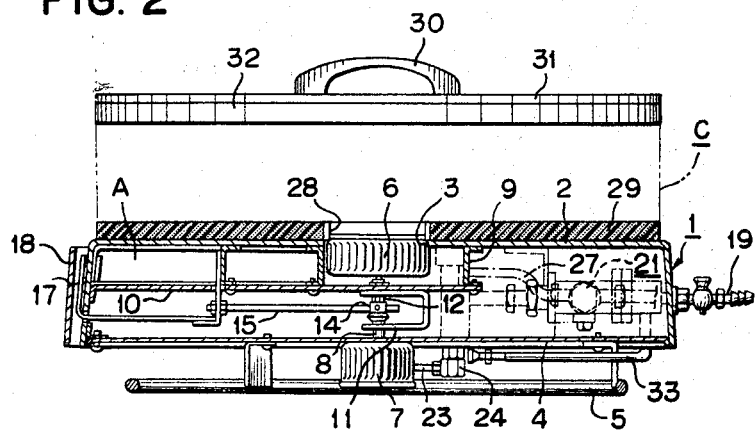

Other objects and features of this invention will be made clear by studying the following description of one embodiment of this invention in conjunction with the accompanying drawing wherein:

FIG. 1 is a top plan view of the testing device according to this invention with the top wall of the casing being partly broken away in order to show the inner construction of the device; and, FIG. 2 is a cross sectional view of the testing device according to this invention taken on line II—II of FIG. 1.

As is illustrated in the drawings, this invention is embodied in a cylindrical casing 1 having a top closure plate or wall 2 and a side wall integrally formed therewith, the bottom of which casing is open.

An air intake opening 3 is formed in the top plate or wall 2 at substantially the center portion thereof.

A bottom plate or wall 4, to which a circular stand member 5 is fixed, is attached to the bottom portion of side casing 1 by any conventional means, such a welding or bolts and nuts.

Turbine fans 6, 7 are respectively provided beneath the opening 3 in the top plate 2 and beneath the bottom plate 4 so as to rotate together around a shaft 8.

There is a curved partition wall 9 in the casing 1 to form a corridor or passage A together with the top wall 2 as well as a part of the side wall for leading the air from the opening 3 to one direction (counterclockwise in FIG. 1) outwardly to a circumferential portion of the casing 1. A plate member 10 forms the bottom wall of such corridor.

A U-shaped indicator holder 11 is fixed at the lower surface of the plate 10, the former having a fulcrum shaft 12 which is loaded with a spring 13 for biassing the fulcrum shaft to rotate in one direction. Fixed on the shaft 12 is an indicator support member 14 to which one end of an indicator rod 15 is supported. At the other end of the indicator shaft 15, a baffle plate 16 is mounted so as to block the outlet of the corridor or chamber A formed by the partition wall 9 and the plate 10 within the casing 1. At the outer free end of the indicator shaft 15 an L-shaped indicator 17 is fixed so that a vertical arm of the indicator 17 is projected from a slit provided in the side wall of the casing 1. Thus, when flowing air from the fan 6 is blown against the baffle plate 16, the assembly (15, 16, 17) will be deviated counterclockwise in FIG. 1 about the shaft 12 against the action of the spring 13. The movement of the indicator 17 is observed through a transparent cover member 18 fixed with a space on the side wall of the casing 1.

There are provided in the casing 1 at the side wall thereof a fitting member 19 for connecting a pressure air tube (not shown), an adjusting dial 20 connected to a reducing valve 21 and a pressure guage 22. In the vicinity of the lower fan 7 there is provided a nozzle 23 connected to a nozzle support member 24 so as to drive the fan 7 by jet blowing out of the nozzle. Tubes 25, 26 and 27 are provided respectively to connect the fitting member 19 with the reducing valve 21 and said valve with the pressure guage 22 and with the nozzle support member 24, so as to form a passage of air under pressure (FIG. 1).

The upper surface of the top plate 2 receives a packing pad 29 made of foam rubber or the like having a center opening 28, on which pad is placed an air cleaner C to be tested. Depending on the type of the air cleaner, a cover plate 31 is mounted on the cleaner C preferably with inserting a packing pad 32 also made of foamed rubber. The cover plate 31 is preferably provided with a handle 30 thereon.

To operate the device according to the present invention, the tube from an air compressor (not shown) is fitted to the fitting member 19, the air cleaner C to be tested which has been removed from the automobile, is mounted on the upper surface of the testing and if necessary the cover plate 31 is sealingly mounted on the upper surface of said air cleaner C.

The air under pressure flows into the valve 21 from the air compressor through the fitting member 19 and the tube 25.

After regulating the pressure of air, the desired pressure of air is led to the pressure guage 22 and to the nozzle 23 respectively through the tubes 26 and 27. The jet from the nozzle causes the lower fan 7 to rotate. The pressure of the air from the nozzle is adjusted by the adjusting dial 20 connected to the regulator 21. The rotation of the lower fan 7 causes the rotation of the upper fan 6 mechanically connected therewith through the connecting shaft 8, whereby a suction force or reduced pressure is caused around the opening 3. The suction force sucks the air from the air cleaner C, the sucked air being bled off from the air cleaner and through the center opening 28 formed in the bottom thereof. This air flows into the casing 1 through the opening 3, and then led into the chamber A along the partition wall 9. This flowing air will be blown against the baffle plate 16.

When the plate 16 is deflected, the indicator shaft 15 is angularly moved about the fulcrum shaft 12 against the action of the spring 13. Therefore, the indicator 17 is moved along the side wall of the casing, the movement of the indicator 17 showing the condition of the air cleaner C.

I claim:
1. In a testing device for air cleaners, the combination comprising
   a casing having a generally cylindrical sidewall and a centrally apertured top wall,
   a packing pad mounted on said top wall and having a central aperture alignable with the top wall aperture whereby said pad is adapted to receive an air cleaner,
   a plate member mounted in said casing beneath said top wall,
   a partition wall between portions of said top wall and said plate member having an arcuate configuration defining a chamber extending from the top wall aperture to a peripheral portion of said casing,
   a baffle plate defining a movable wall of said chamber and having one end pivotally carried by said casing,
   an indicator on an opposite end of said baffle plate extending through a portion of said cylindrical wall,
   a driven fan disposed in the top wall aperture for drawing air from an air cleaner into said chamber whereby the air is directed through said chamber against said baffle plate to indicate the condition of the air cleaner,
   a driving fan having a shaft operatively connected to said driven fan for rotating the same, and means for operating said driving fan including a nozzle jet and a source of pressurized air whereby air from said nozzle jet impinges on said driving fan.

References Cited

UNITED STATES PATENTS

| | | | |
|---|---|---|---|
| 1,479,093 | 1/1924 | Summers | 253—81 |
| 2,355,858 | 8/1944 | Hahn et al. | 73—38 |
| 3,034,337 | 5/1962 | Parmater | 73—38 |
| 3,111,029 | 11/1963 | Gray | 73—228 XR |
| 3,242,730 | 3/1966 | Peltola | 73—228 |
| 3,320,792 | 5/1967 | Peranio | 73—38 |

DAVID SCHONBERG, *Primary Examiner.*

LOUIS R. PRINCE, *Examiner.*

J. NOLTON, *Assistant Examiner.*